US006643702B1

(12) United States Patent
Yeung

(10) Patent No.: US 6,643,702 B1
(45) Date of Patent: Nov. 4, 2003

(54) TRAFFIC SCHEDULER FOR A FIRST TIER SWITCH OF A TWO TIER SWITCH

(75) Inventor: Pauline Sai-Fun Yeung, San Jose, CA (US)

(73) Assignee: Omneon Video Networks, Sunnyvale, CA (US)

( * ) Notice: Subject to any disclaimer, the term of this patent is extended or adjusted under 35 U.S.C. 154(b) by 0 days.

(21) Appl. No.: 09/545,163

(22) Filed: Apr. 7, 2000

(51) Int. Cl.[7] .............................................. G06F 13/00
(52) U.S. Cl. ....................... 709/238; 709/226; 709/249; 370/230
(58) Field of Search ................................. 709/226, 230, 709/236, 238, 239, 240, 245, 249; 370/230, 238.1, 401

(56) References Cited

U.S. PATENT DOCUMENTS

| 5,627,971 | A | * | 5/1997 | Miernik ..................... 709/241 |
| 5,825,766 | A | * | 10/1998 | Kobayashi et al. ......... 370/395 |
| 6,021,263 | A | * | 2/2000 | Kujoory et al. ........ 395/200.62 |
| 6,118,791 | A | * | 9/2000 | Fichou et al. ............... 370/468 |
| 6,356,546 | B1 | * | 3/2002 | Beshai ........................ 370/358 |

* cited by examiner

Primary Examiner—Viet D. Vu
(74) Attorney, Agent, or Firm—Blakely, Sokoloff, Talyor & Zafman LLP

(57) ABSTRACT

A method comprising initializing an eligibility bit map and determining whether at least one eligible route has required resources available is disclosed.

5 Claims, 10 Drawing Sheets

TRAFFIC SCHEDULER FOR A FIRST TIER SWITCH OF A TWO TIER SWITCH

FIELD OF INVENTION

The present invention relates generally to switches. More specifically, the present invention relates to isochronous queue and buffer management in switches.

BACKGROUND OF THE INVENTION

The IEEE Standard for a High Performance Serial Bus, IEEE Std. 1394-1995 published Aug. 30, 1996 (1394-1995 Standard) and its progeny provide a high speed serial protocol which permits implementation of high speed data transfers. The existing progeny includes P1394a Draft Standard for a High Performance Serial Bus (1394a Standard) and P1394b Draft Standard for a High Performance Serial Bus (1394b Standard). Generically, systems implementing 1394-1995, 1394a, 1394b or subsequent revisions and modifications thereof are referred to herein as 1394 systems.

The IEEE 1394 standard is an international standard for implementing a high-speed serial bus architecture, which supports both asynchronous and isochronous format data transfers. The IEEE 1394 standard defines a bus as a non-cyclic interconnect. Within a non-cyclic interconnect, devices may not be connected together so as to create loops.

In networks, switches filter and forward packets between local area network segments. In packet switching, packets are individually routed between nodes with no previously established communication path. An algorithm is used to route packets to their destination through the most expedient route. The destination computer reassembles the packets in their appropriate order. Packet switching optimizes the use of bandwidth available in a network and minimizes the latency (the time it takes for a packet to cross a network connection, from sender to receiver).

In a 1394 network with multiple 1394 buses and 1394 switches, all the 1394 buses should be synchronous. But due to cycle skewing, the cycle start packets are not all generated at the same time in different 1394 buses. Cycle skewing occurs when a large asynchronous packet is sent over a bus and the large packet is late, which may delay the start of the next cycle.

In a switch, there may be packets arriving from different ingress ports routed to one egress port. Because of cycle skewing, a packet from one cycle may arrive in the egress port after a packet from a subsequent cycle.

Packets being switched may also be transmitted out of order from the switch because a first packet arriving before a second packet at a switch may not be completely received before the second packet is completely received. Thus, the second packet would be sent out before the first packet because the second packet was completely received before the first packet.

SUMMARY OF THE INVENTION

A method comprising initializing an eligibility bit map and determining whether at least one eligible route has required resources available is disclosed.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and system for a method and system for isochronous queue and buffer management are described.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

Figure 1:
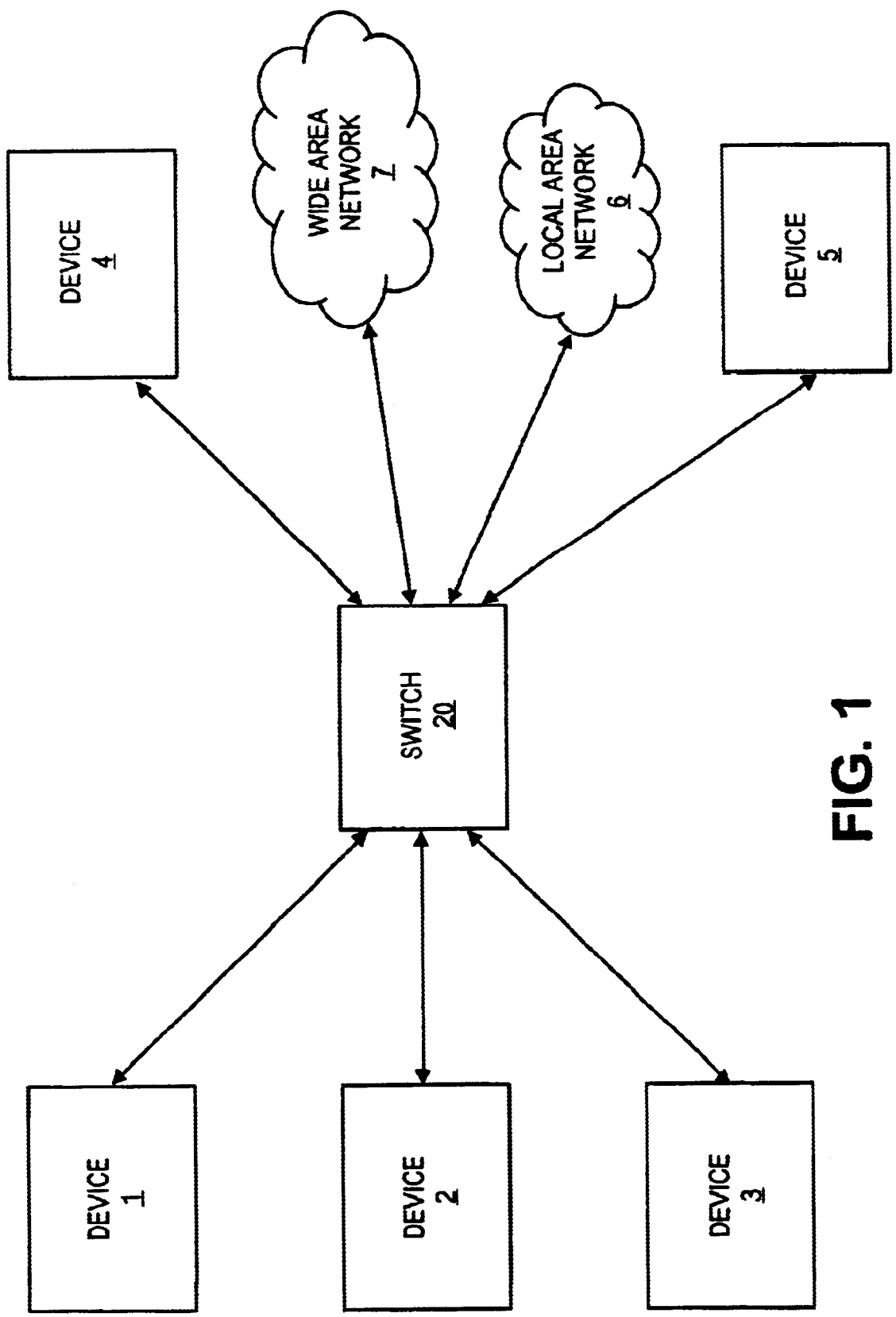
FIG. 1 is a block diagram of one embodiment of a switch in a communications network.

FIG. 1 is a block diagram of one embodiment of the switch in a communications network. Switch 20 is connected to devices 1–5, a wide area network 7 and a local area network 6. Devices 1–5 may include audio, video and/or audio/video devices including storage systems and telecommunications. The wide area network may include the internet or proprietary network or a television communications network.

Figure 2:
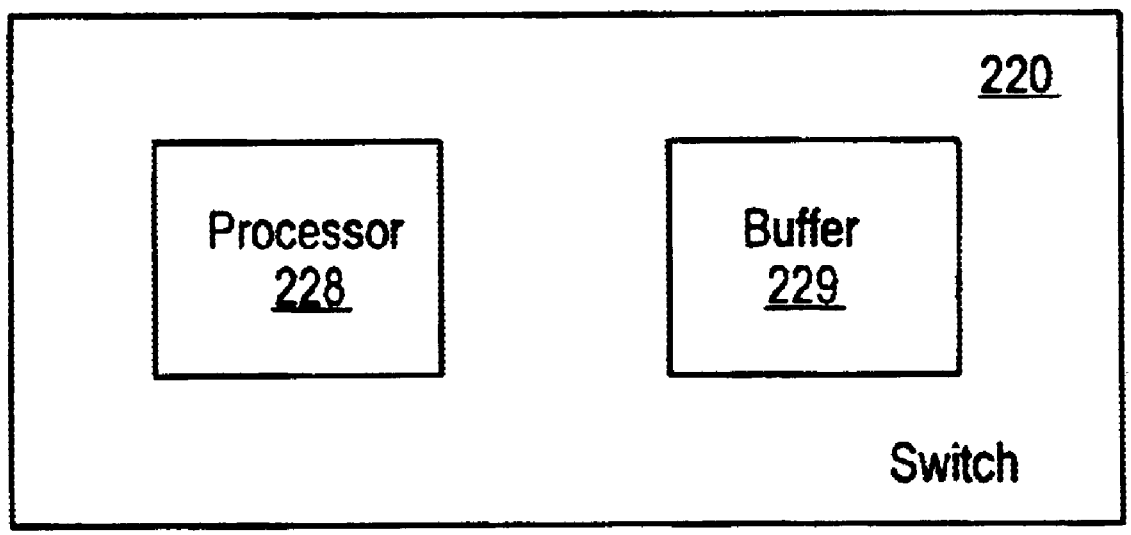
FIG. 2 is a block diagram of one embodiment of a switch.

FIG. 2 is a block diagram of one embodiment of a switch. FIG. 2 shows a switch 220 including a processor 228 and a buffer 229. The processor 228 directs operations within the switch 220 and the buffer 229 stores switched packet streams to be transmitted, as described below. Switch 220, according to one embodiment, is configured to switch packets on a IEEE 1394 Standard Serial Bus.

Figure 3:
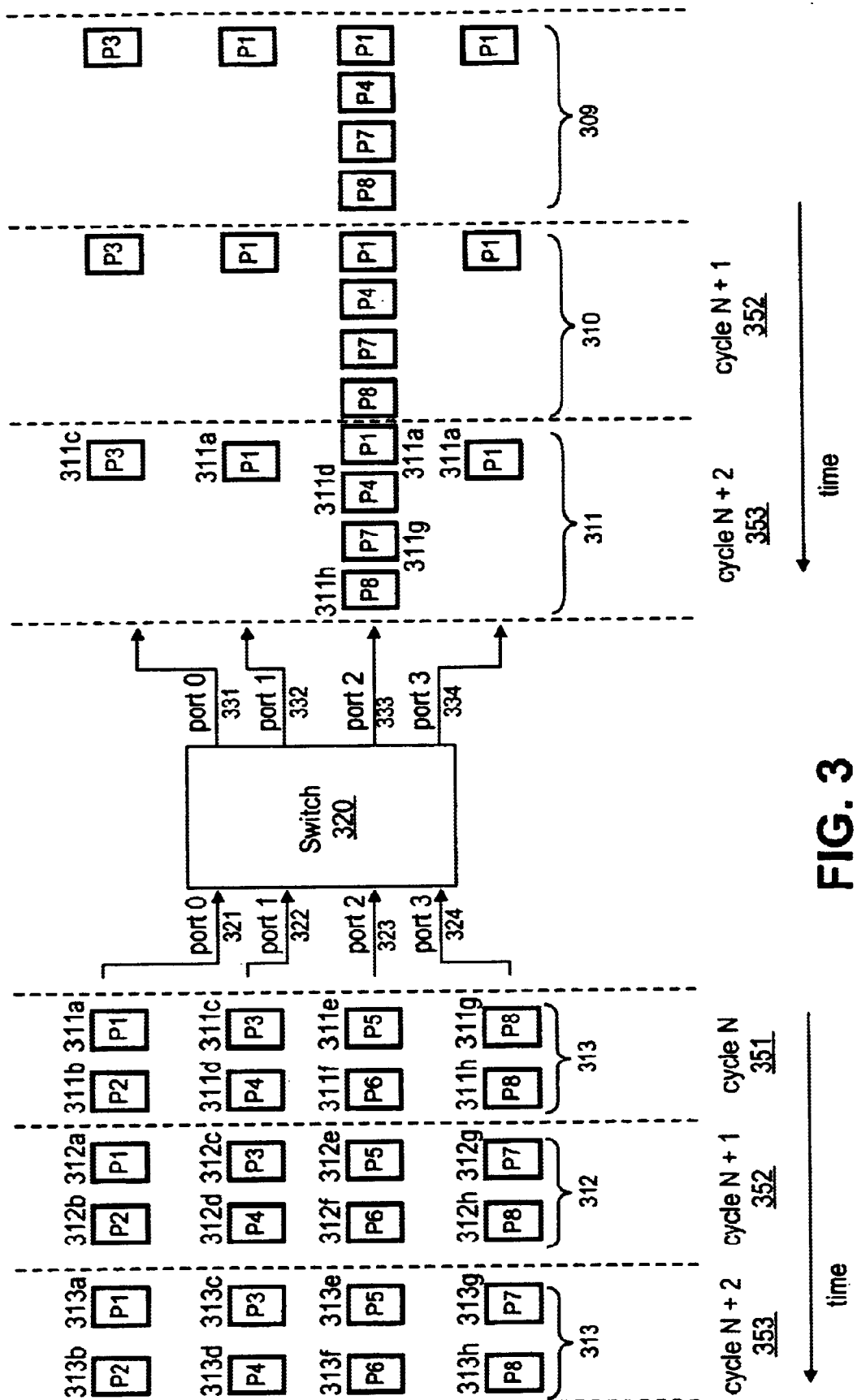
FIG. 3 is a block diagram of packet processing in one embodiment of a switch.

FIG. 3 is a block diagram of packet processing in one embodiment of a switch. FIG. 3 illustrates a switch 320 having ingress ports 321–324 and egress ports 331–334. The number of ingress ports and egress ports in the switch may vary depending on the application and how many devices or buses are served by the switch.

Each ingress port 321–324 receives a stream of packets. Ingress port 321 receives a stream of packets including packets 311$a$–$b$, 312$a$–$b$, and 313$a$–$b$. Ingress port 322 receives a stream of packets including packets 311$c$–$d$, 312$c$–$d$, and 313$c$–$d$. Ingress port 323 receives a stream of packets including packets 311$e$–$f$, 312$e$–$f$, and 313$e$–$f$. Ingress port 324 receives a stream of packets including packets 311$g$–$h$, 312$g$–$h$, and 313$g$–$h$. Each ingress port 321–324 may be associated with an IEEE Standard 1394 Bus (not shown) or other connections or channels including ethernet, asynchronous transfer mode (atm), T-1 or T-3 carrier, OC-X or any other suitable connection. Packets in packet streams 311–313 may be isochronous packets, according to one embodiment, or any other type of packet that is suitable.

FIG. 3 shows packet streams 311–313 arriving at ingress ports 321–324 as follows: packets 311a–h arrive at ingress ports 321–324 during cycle (N) 351, packets 312a–h arrive at ingress ports 321–324 during cycle (N+1) 352, and packets 312a–h arrive at ingress ports 321–324 during cycle (N+2) 353.

FIG. 3 shows packet stream 311 leaving switch 320 through egress ports 331–334 at cycle (N+2) 353. Packets 311 arriving at switch 320 at cycle N may be switched during cycles (N), (N+1) and, possibly (N+2). The packets 311 are sent out during cycle (N+2), two cycles after they arrive. As shown in egress cycles 351 and 352, packets 309, which arrived during cycle (N−2) (not shown) are sent out at cycle (N) 351 and packets 310, which arrived during cycle (N−1) (not shown) are sent out at cycle (N+1) 352.

The minimum delay of a 1394 isochronous packet in a 1394 switch is two 1394 cycles. Thus, the 1394 switch 320 uses a buffer management system, as discussed below, to assure that packets arriving at a cycle (N) 351 are sent out in a cycle (N+2) 353.

Figure 4:
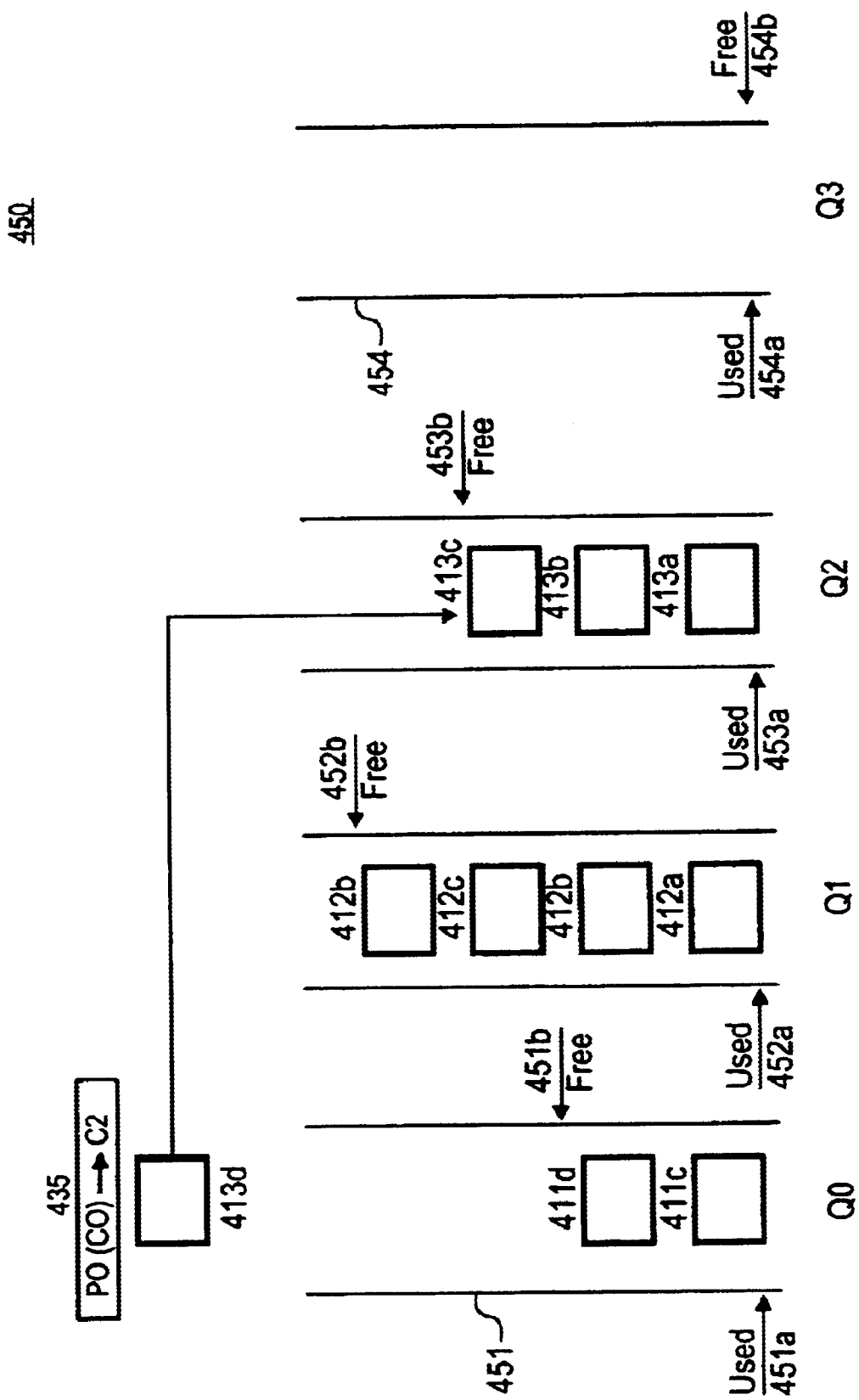
FIG. 4 is a block diagram of buffer management in one embodiment of a switch.

FIG. 4 is a block diagram of a buffer management system in one embodiment of a switch. In the embodiment shown, buffer management system 450 includes four queues Q0–Q3 451–454 each having a Used pointer 451–454a and a Free pointer 451–454b. Although the buffer management system 450 shown in FIG. 4 includes four queues, three queues may be used instead. Each egress port 331–334 has a buffer management system 450 including four queues Q0–Q3 451–454.

In the embodiment shown, packet streams 411, 412, and 413 have arrived at a switch 320. Packet streams 411–413 include packets 411a–411d, 412a–412d and 413a–413d, respectively. The queue numbers correspond to the cycle of the switch 320 in which the packet streams 411–413 will be sent out. As shown by block 435, a packet stream P0(C0) 413, where (C0) represents a time stamp of cycle C0, arrives at cycle C0 and will be sent out at cycle C2.

As egress packet queues 451–454 are filled up, the free pointer values 451–454b are set at free=n, where n represents the point at which packets may be added to queues 451–454. Thus, as shown with reference to Q2 453, free pointer 453b points to the free space after packet 413c, where packet 413d is to be received.

Also, as the packet queues 451–454 are filled up, the used pointer value is set to represent the next packet to be transmitted, as shown by pointers 451–454a. As shown with reference to Q2 453, used pointer 453a is set to 0 and points to space from which the next packet is to be transmitted from the queue Q2 453, through an egress port 331–334 of switch 320. With reference to Q0 451, which is in the process of transmitting packets, the used pointer value 451a equals m, where m represents the space from which the next packet will be sent.

When an packet queue 451–454 is flushed or cleared, a used pointer value 451–454b is set to 0 to show that the space from which the next packet is to be transmitted. As shown with reference to Q3 454, used pointer 454b points to the space from which the next packet is to be transmitted from queue Q3 454, through an egress port 331–334 of switch 320. Also, when a packet queue 451–454 is flushed or cleared, a free pointer value is set to 0 to show that the queue is empty. As shown with reference to Q3 454, to show that the queue 454 is free, 454a is set to 0 to point to the place in queue Q3 454 where the next packet may be placed.

At any given cycle C of the switch 320, there are isochronous packets in the switch 320 which arrived in cycle C, C−1 557, and C−2 556. To guarantee the packets are sent in the proper cycle, at least three packet queues are needed for every egress port.

Figure 5:
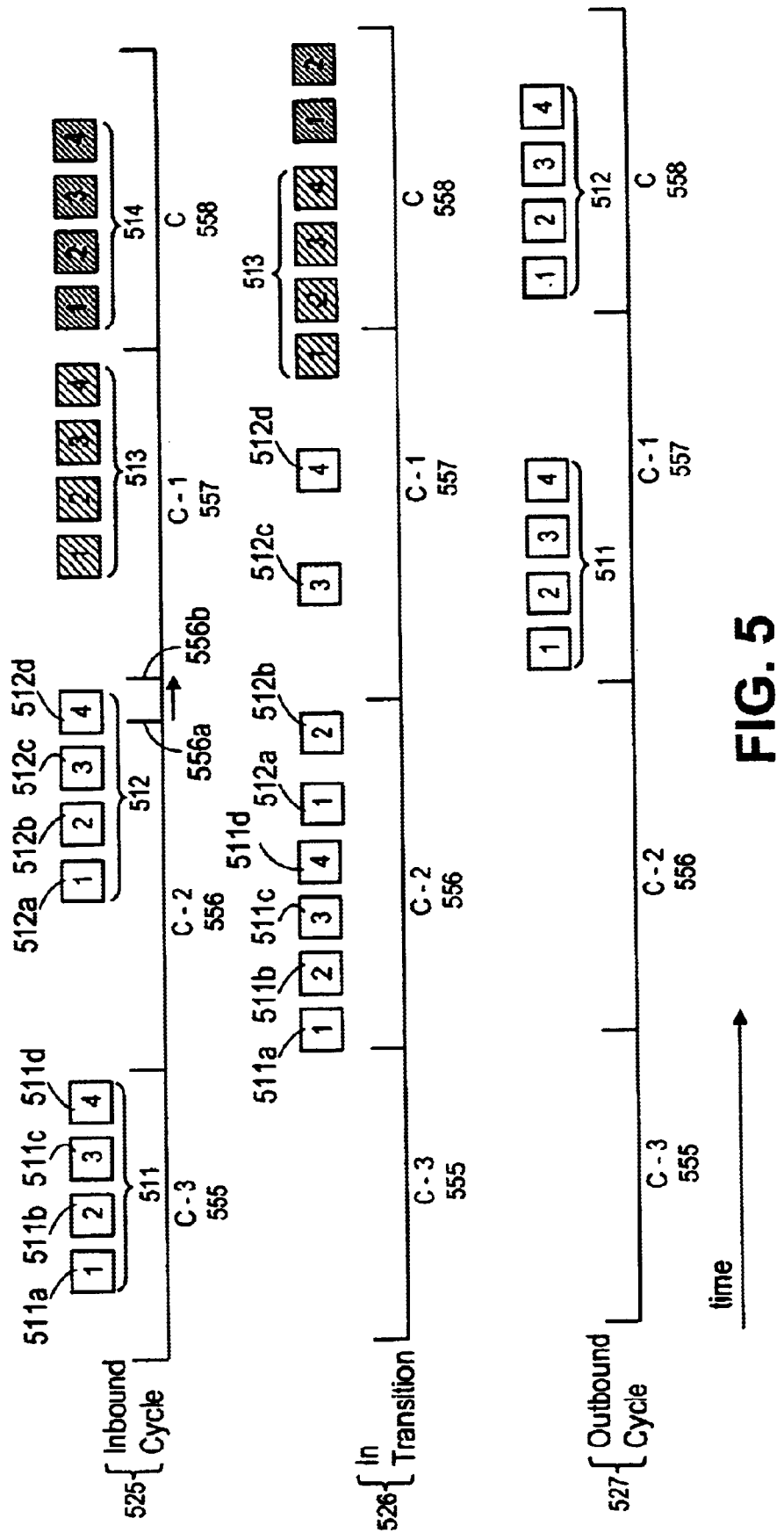
FIG. 5 is a block diagram of delay adjustment in one embodiment of a switch.

FIG. 5 is a block diagram of delay adjustment in one embodiment of a switch. A delay adjustment may become necessary where cycle skewing, as described above, occurs. A switch 320 includes an inbound cycle 525, a transition cycle 526 and an outbound cycle 527. Packet streams 511a–d, 512a–d, 513a–d, and 514a–d are received at switch 320 during cycles C−3 555, C−2 556, C−1 557, and C 558 of the inbound cycle of the switch.

In the embodiment shown, input packets 511 comes in at inbound cycle C−3 555 and input packets 512 starts to come in at inbound cycle C−2 556 of inbound cycle 525. However input packet stream 512 includes packet 512d which comes in at the end of cycle C−2 556 and almost in cycle C−1 557. Thus, cycle C−2 556 is expanded from 556a to accommodate the late packet and cycle C−1 557 is shortened.

In transition cycle 526, packets 512a and 512b of input packets 512 are switched during cycle C−2 556 and placed in the appropriate egress packet queue 451–454, while packets 512c and 512d are switched at cycle C−1 557 and placed in the appropriate packet queue 451–454. Because packets 512 arrived during inbound cycle C−2 556, it will be buffered to go out at cycle C even though a few of the packets were late. Thus, input packets 512 is sent out at cycle C 558 of outbound cycle 527.

Packets 511, received at cycle C−3 555 is switched during cycle C−2 556 of the transition cycle, and sent out at cycle C−1 557. However, packets 511 need not be switched at cycle C−2 556. Packets 513, which is received during cycle C−1 557 is switched during cycles C−1 557 and C 558, and will be sent out during cycle C+1, not shown. Packet 513a is switched during cycle C−1 557 and packets 513b–d are switched during cycle C 558. Also, as shown, packets 514a–b are switched at cycle C 558, the cycle during which packets 514 was input.

Figure 6:
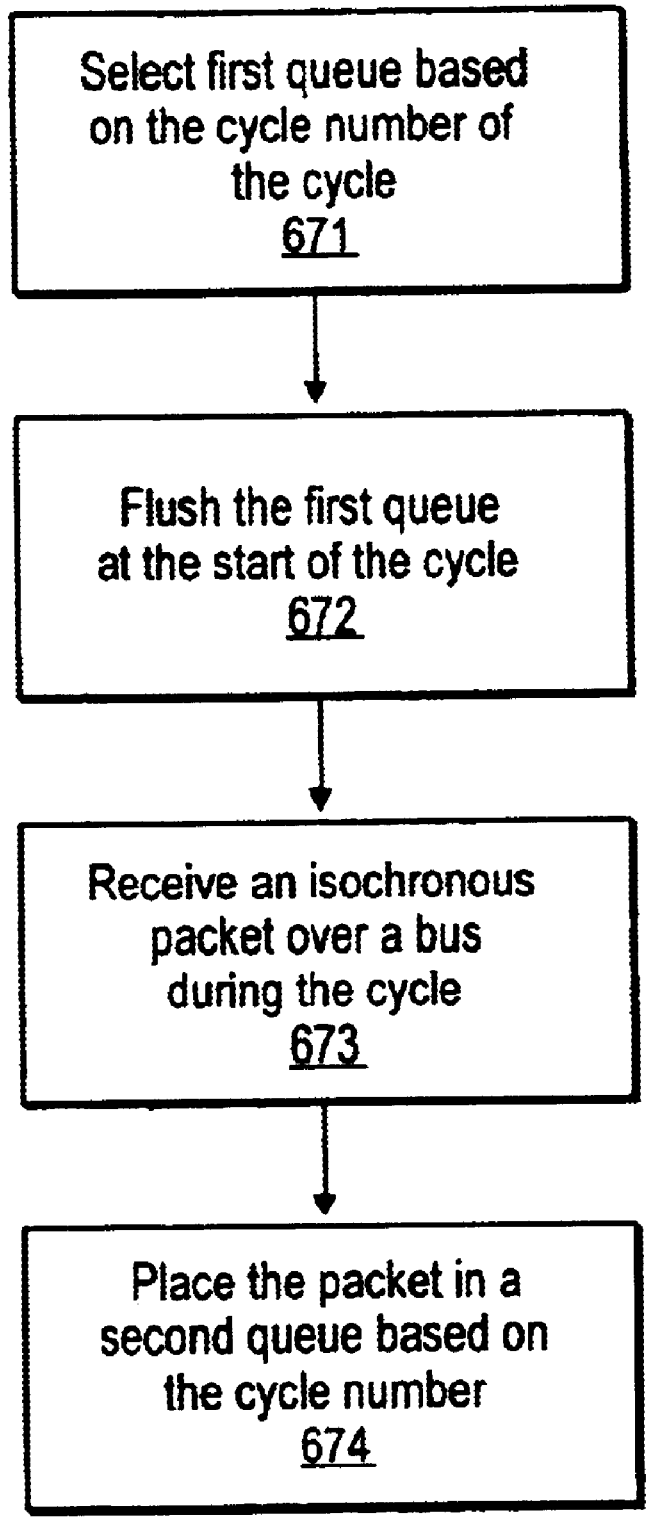
FIG. 6 is a flow diagram for packet processing in one embodiment of a switch.

FIG. 6 is a flow diagram for packet processing in one embodiment of a switch. At processing block 671, a first queue is selected based on the cycle number of the egress cycle of the switch 220. At processing block 672, the first queue is flushed at the start of the cycle. At processing block 673, an isochronous packet is received over a bus. At processing block 674, the packet is placed in a packet queue based on the cycle number of the cycle. The multiple packet queues Q0–Q3 451–454 are used in each egress port of the 1394 switch to resolve the order of packets that will depart in different cycles according to the egress 1394 cycle time.

Thus, if n queues are used for each port, where n·3, packets that arrived in cycle C would go to queue number (C+2) % n (where % stands for remainder). In cycle C, the egress port sends packets from queue (C % n). Thus, if cycle number C is 5 and the number of queues equals 4, the egress port will send packets from queue number Q1, since the remainder of (5/4) is one.

When a packet stream 411 arrives at the egress port, as represented in processing block 673, a packet buffer 451–454 is allocated from the packet buffer pool to hold the complete packet. When this packet departs, there is no need to free the memory associated with this packet buffer. Rather at the beginning of each cycle C, all memory in the packet buffer pool associated with packet queue number (C−1) % n is reclaimed. Thus if the cycle number is 5 and the number of queues equals 4, Q0 451 would be flushed at the beginning of cycle five while Q1 is being filled up. Thus, the queue being filled, the queue being flushed and the queue having packets transmitted are all based on the cycle number of the 1394 switch.

Figure 7:
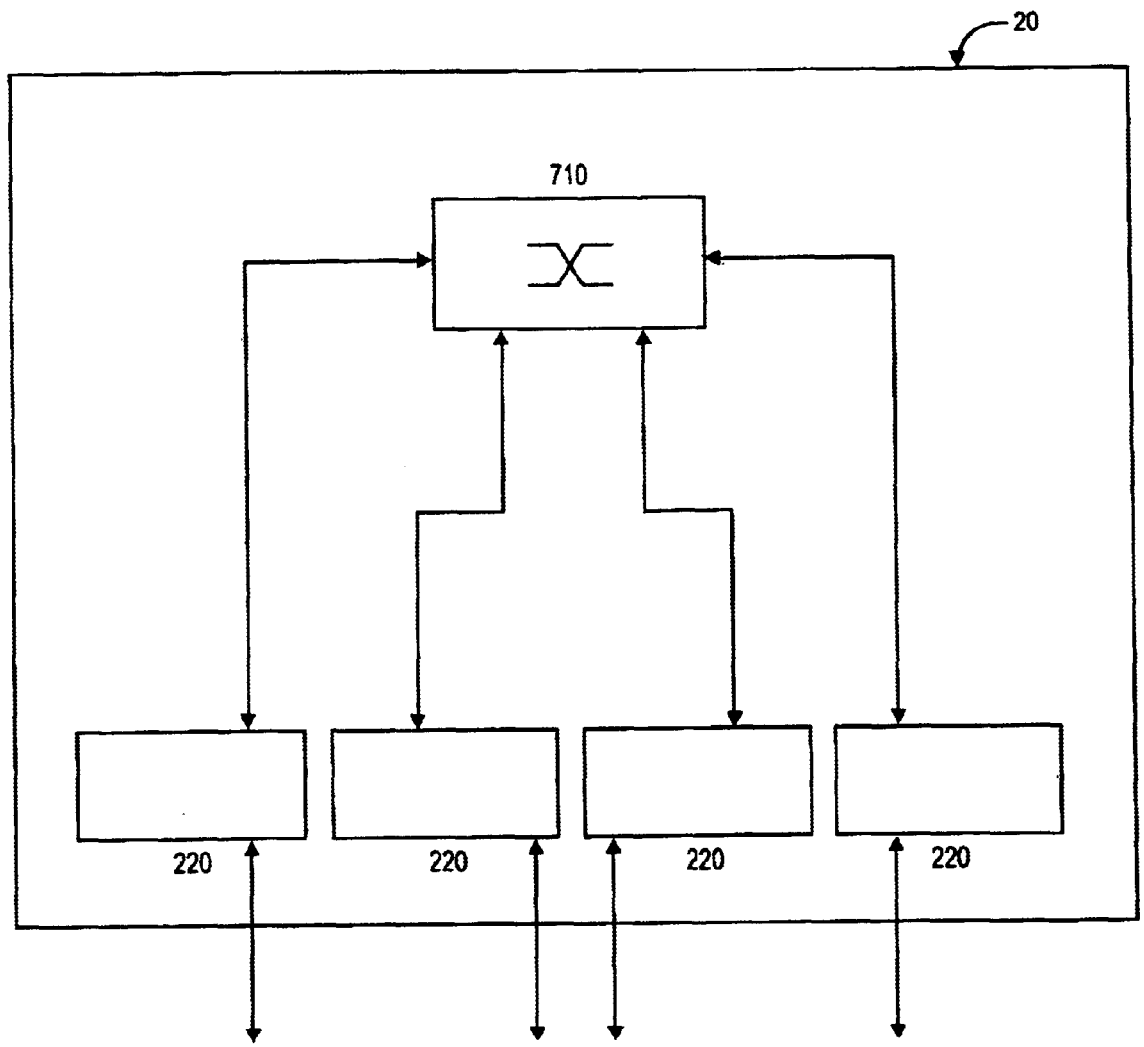
FIG. 7 is an embodiment of a two-tiered switch.

In order to increase the number of available ingress and egress ports, the switch 20 shown in FIG. 1 may include several first tier switches 220 as shown in FIG. 2, and a second tier switch 710, as shown in FIG. 7. The first tier switches 220 may each have N number of ports. Because the first tier switches are linked by a second tier switch 710, the total number of available ports becomes N multiplied by the total number of first tier switches.

The first tier switches 220 receive the data traffic from their ingress ports, and route the traffic to the appropriate egress port or ports by placing the traffic on a virtual path to second tier switch 710. The second tier switch then sends the traffic to an appropriate port or ports through another virtual path from the second tier switch to the appropriate first tier switch or switches. Thus, there are 3 data traffic round robin schedules. One is from the first tier to the second tier. Another is asynchronous traffic from the first tier to the 1394 bus, and the third is isochronous data traffic from the first tier to the 1394 bus.

The two types of traffic that are received by the ports of the first tier switches 220 are isochronous and asynchronous data traffic. Generally, in an IEEE 1394 standard switch, each isochronous cycle is 125 microseconds. 100 microseconds are used for transmitting and receiving isochronous data, and 25 microseconds are used for the asynchronous data, if there is any, or otherwise for the isochronous data. Therefore, the scheduling time for the isochronous data is generally four times greater than that of the asynchronous data. The second tier traffic can be received and transmitted during the entire isochronous cycle.

Figure 8:
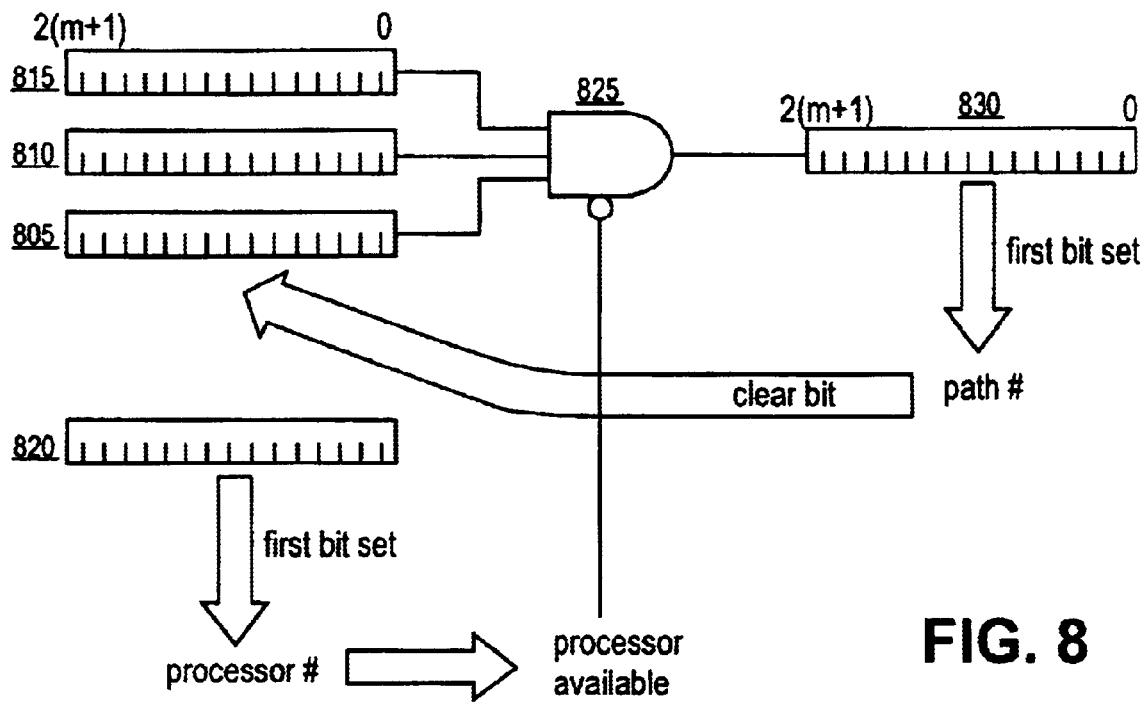
FIG. 8 is an embodiment of an apparatus for scheduling crossbar traffic.

An apparatus for scheduling the crossbar traffic, also called second tier switch traffic is shown in FIG. 8. The bit maps used to schedule the second tier switch traffic have a length that is proportional to the number of first tier switches. For example, if there are M first tier switches, then each bit map has 2(M+1) bits. This corresponds to the number of virtual paths that are needed to transmit the second tier switch traffic.

An eligible path bit map 805 is used to create a quasi round robin schedule. The bits of the eligible path bit map 805 are initially set to all ones. This means that all paths are eligible to transmit data traffic. A queue status bit map 810 is used to determine the status of the output queue for a corresponding virtual path. A value of one may be used to indicate that a given queue is ready because the queue is filled with the entire packet or packets, and a value of zero may be used to indicate that the queue is not filled.

A path ready bit map 815 is used to indicate whether a given virtual transmission path is available and ready to transmit data traffic. A processor bit map 820 indicates the availability of processors that can transmit a packet in the transmission queue to a virtual path. Each switch has a plurality of processors. Each processor may be mapped to a specific virtual path. A value of zero may indicate that the processor is idle, while a value of one may indicate that the processor is busy. A packet may be sent from the first tier switch along a virtual path to the second tier switch, or from the second tier switch along another virtual path to one or more first tier switches, when the required resources are available and ready to the path, including the queue is ready, a processor is ready, and the path is ready.

Permission to transmit a given amount of data is granted to the lowest eligible path that has the required resources available to it. In one embodiment, the given amount of data is 128 bytes of data. The lowest eligible path may be defined as the first eligible path closest to the right edge of the eligible path bit map that has a corresponding queue that is ready, a path that is ready, and a processor available to process the transmission. This path may be determined by performing an AND function on the bit maps 805, 810 and 815 using logic 825. The lowest bit in output bit map 830 identifies the lowest eligible path with the required resources available. The processor bit map 820 enables the logic 825 to identify the path when a processor is also available.

If the output bit map 830 contains all zeros, then the apparatus repeats the process to determine a non-eligible path by using only bit maps 810, 815 and the enable bit map 820. After the eligible path is granted permission, the data is transmitted and the corresponding bit in the eligible path bit map is changed to zero. If there is no eligible path that has the required resources available, then the permission is granted to the queue associated with lowest non eligible path having the required resources available to it.

The apparatus continues to grant permission to the lowest eligible path having the required resources available to it if there is one, or to the lowest non eligible path having the required resources if there is no eligible path that is ready, until all of the paths are non eligible paths. Then, the eligible path bit map is reset so that all of the paths are eligible, and the scheduling of second tier switch traffic along the virtual transmission paths continues. Because the eligible ports with the required resources are scheduled to transmit before non eligible ports, the scheduling that is performed is a modified round robin schedule.

Figure 9:
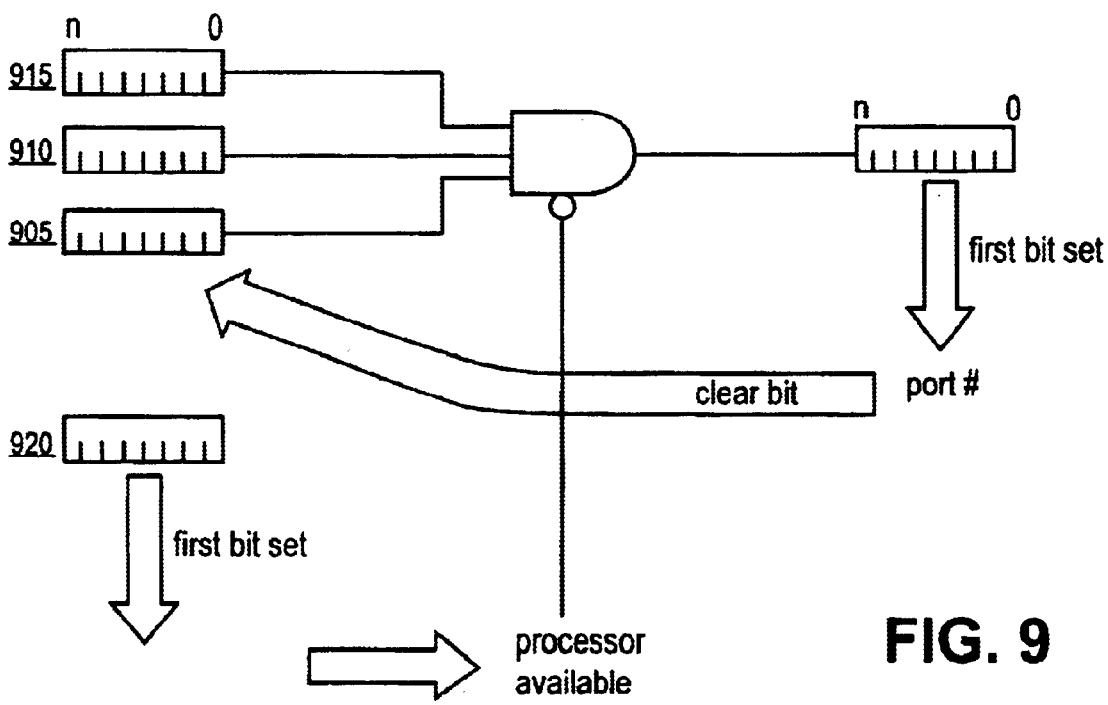
FIG. 9 is an embodiment of an apparatus for scheduling asynchronous traffic.

An apparatus for scheduling the asynchronous traffic is shown in FIG. 9. The bit maps used to schedule the asynchronous traffic have a length that is proportional to the number of ports. For example, if there are N ports on a first tier switch, then each bit map has N bits.

An eligible port bit map 905 is used to create a quasi round robin schedule. The bits of the eligible port bit map are initially set to all ones. This means that all ports are initially eligible to receive data traffic. A queue status bit map 910 is used to determine the status of the queue for a corresponding port. A value of one may be used to indicate that a given queue is ready because the queue is filled with the entire packet or packets, and a value of zero may be used to indicate that the queue is not filled.

A port ready bit map 915 is used to indicate whether a given port is available and ready to transmit or receive data traffic. A processor bit map indicates the availability of processors that can service a queue to a port. Each switch has a plurality of processors. Each processor may be mapped to a specific port. A value of one may indicate that the processor is idle, while a value of zero may indicate that the processor is busy. A packet may be received by a port when the required resources are available and ready to the port, including the queue is ready, a processor is ready, and the port is ready.

Permission to transmit a given amount of data is granted to the lowest eligible port that has the required resources available to it. In one embodiment, the given amount of data is 128 bytes of data. The lowest eligible port may be defined as the first eligible port closest to the right edge of the eligible port bit map that has a corresponding queue that is ready, a port that is ready, and a processor available to process the transmission. This port may be determined by performing an AND function on the bit maps 905, 910 and 915 using logic 925. The lowest bit in output bit map 930 identifies the lowest eligible port with the required resources available. The processor bit map 920 enables the logic 925 to identify the port when a processor is also available.

If the output bit map 930 contains all zeros, then the apparatus repeats the process to determine a non-eligible port by using only bit maps 910, 915 and the enable bit map 920. After the eligible port is granted permission, the data is transmitted and the corresponding bit in the eligible port bit map is changed to zero. If there is no eligible port that has the required resources available, then the permission is granted to the queue associated with lowest non eligible port having the required resources available to it.

The apparatus continues to grant permission to the lowest eligible port having the required resources available to it if there is one, or to the lowest non eligible port having the required resources if there is no eligible port that is ready, until all of the paths are non eligible ports. Then, the eligible port bit map is reset so that all of the ports are eligible, and the scheduling of asynchronous data traffic along the ports continues. Because the eligible ports with the required resources are scheduled to transmit before non eligible ports, the scheduling that is performed is a modified round robin schedule.

Figure 10:
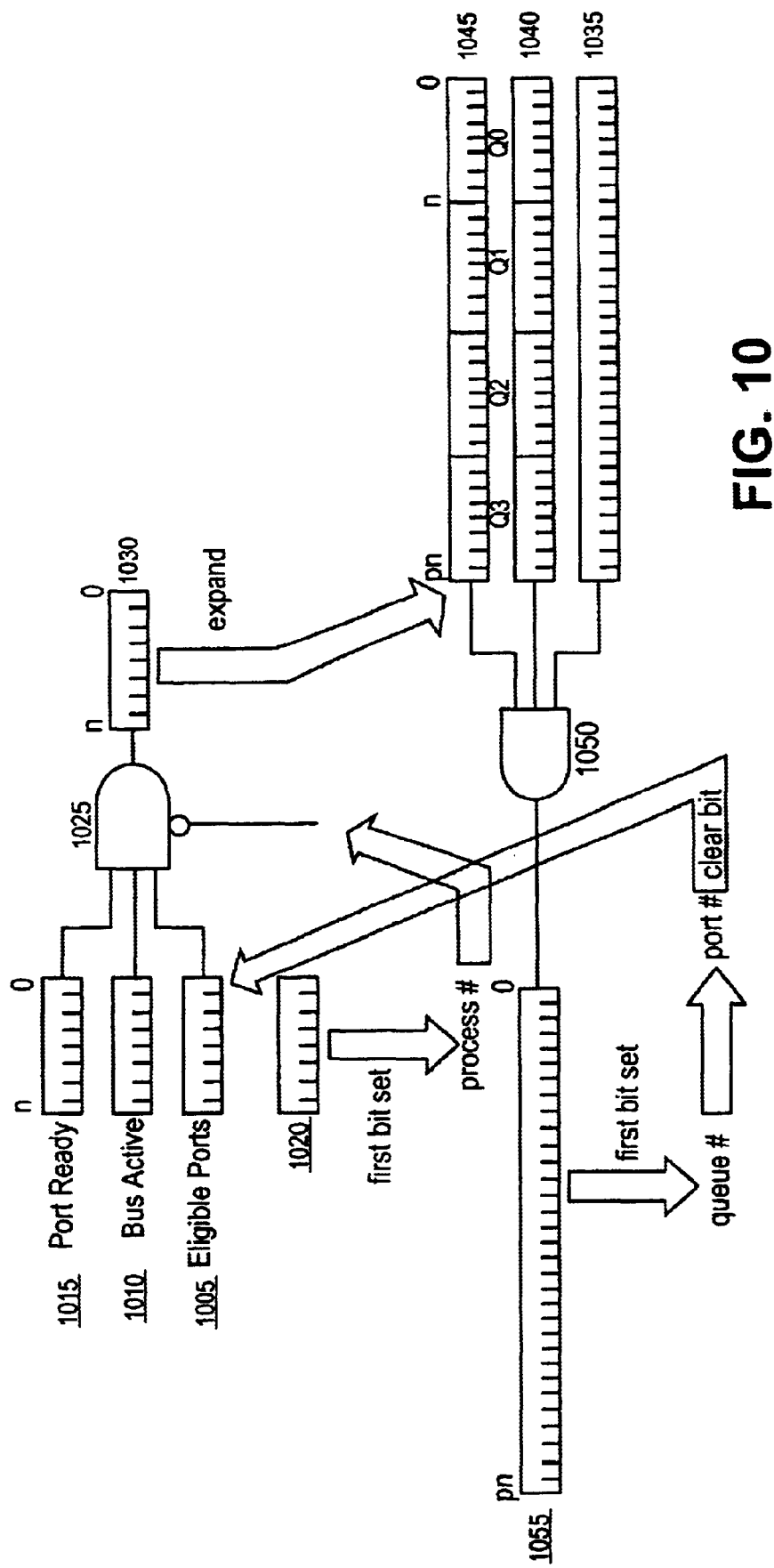
FIG. 10 is an embodiment of an apparatus for scheduling isochronous traffic.

An apparatus for scheduling the isochronous traffic is shown in FIG. 10. The bit maps used to schedule the isochronous traffic have a length that is proportional to the number of ports. For example, if there are N ports on a first tier switch, then each bit map has N bits.

An eligible port bit map 1005 is used to create a quasi round robin schedule. The bits of the eligible port bit map are initially set to all ones. This means that all ports are initially eligible to transmit data traffic. A bus active bit map 1010 is used to determine whether the 1394 bus is active, so that the isochronous data can be transmitted to the bus.

A port ready bit map 1015 is used to indicate whether a given port is available and ready to transmit isochronous data traffic. A processor bit map 1020 indicates the availability of processors that can transmit data to a port. Each switch has a plurality of processors. Logic 1025 receives bits from bit maps 1005, 1010, and 1015 and outputs bit map 1030. Output bit map 1030 is duplicated p times, where p is the number of queues in each port, to create resource bit map 1045, which is pn bits long, where n is the number of ports on the switch. Active cycle bit map 1040 identifies the active cycle of the ports. Queue status bit map 1035 identifies the queue status of each queue. These three bit maps are used by logic 1050, which performs an AND function on the bits of bit maps 1035, 1040, and 1045 to produce output bit map 1055. The lowest bit of bit map 1055 is used to grant permission to the corresponding port and queue.

Permission to transmit isochronous data is granted to the lowest eligible port that has the required resources available to it. The lowest eligible port may be defined as the first eligible port closest to the right edge of the eligible port bit map 1055. After the eligible port is granted permission, the corresponding bit is in the eligible port bit map is changed to zero. If there is no eligible port that has the required resources available, then the cycle is granted to the queue associated with lowest non eligible port having the required resources available to it.

The apparatus continues to grant cycles to the lowest eligible port having the required resources available to it if there is one, or to the lowest non eligible port having the required resources, until all of the ports are non eligible ports. Then, the eligible port bit map is reset so that all of the ports are eligible, and the scheduling of isochronous traffic through the ports of the first tier switch continues. Because the eligible ports with the required resources are scheduled to transmit before non eligible ports, the scheduling that is performed is a modified round robin schedule.

Figure 11:
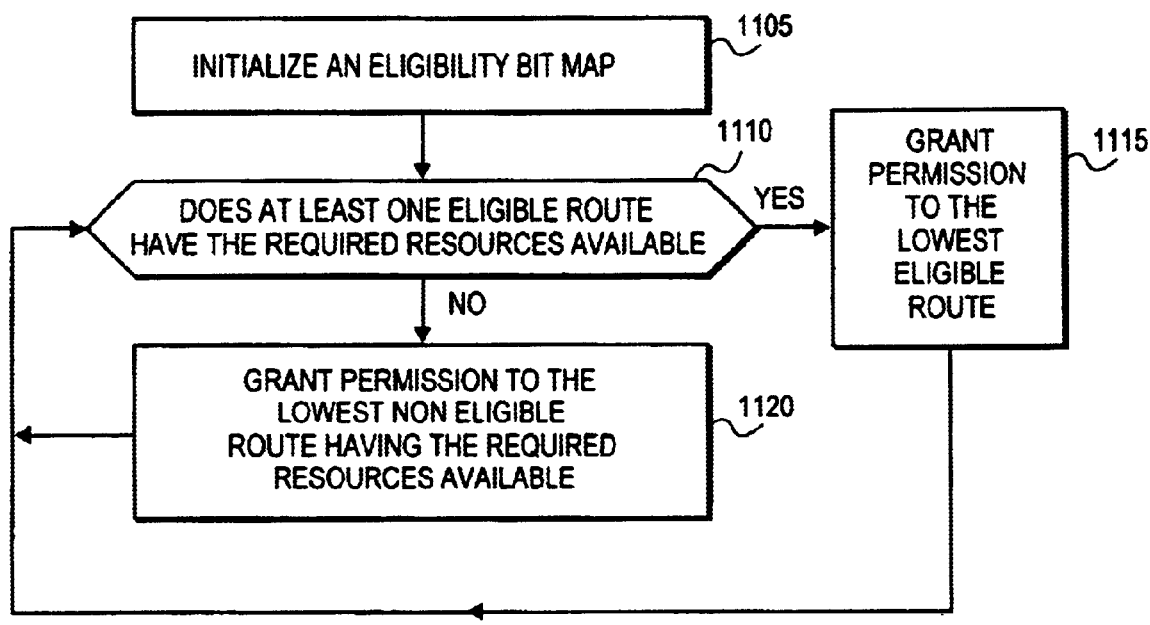
FIG. 11 is a method for scheduling data traffic through the first tier of a two-tiered switch.

A modified round robin scheduling method is used to schedule the asynchronous traffic, the isochronous traffic, and the second tier switch traffic, as shown in FIG. 11. A bit map is used to determine which ports or paths are eligible to handle data traffic. In addition, bit maps are used to determine whether resources associated with the data traffic are also available.

An eligibility bit map is initialized to indicate that all routes are eligible, step 1105. In one embodiment, a route is a virtual path. In another embodiment, a route is a port. Next, the method determines whether at least one eligible route has required resources available, step 1110. In one embodiment, the required resources include having a processor ready, the corresponding queue ready, and the route ready. If so, the method grants permission to transmit to the lowest eligible route with the required resources available, step 1115. If not, the method grants permission to the lowest non eligible route having the required resources available, step 1120. Each time an eligible route is granted a cycle, the status of the route is changed from eligible to non eligible. The process repeats itself after all routes have been granted permission.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:

initializing an eligibility bit map; and determining whether at least one eligible route has required resources available by performing an AND function on the eligibility bit map and at least one required resources bit map to generate an eligible route with required resources available bit map.

2. The method of claim 1, wherein at least one eligible route has required resources available, further comprising:

determining a lowest eligible route having the required resources available by selecting the lowest bit of the eligible route with required resources available bit map.

3. The method of claim 2, further comprising:

granting permission to transmit data to the lowest eligible route having the required resources available.

4. The method of claim 1, wherein no eligible route has the required resources available, further comprising:

determining a lowest non eligible route having required resources available, and granting permission to transmit data to the lowest non eligible route having required resources available.

5. The method of claim 4, wherein the route is selected from the group comprising:

a path or a port.

* * * * *